Aug. 7, 1962 L. GOTTLIEB 3,048,195
CARBONATED BEVERAGE DISPENSING APPARATUS
Filed July 7, 1959 4 Sheets-Sheet 1
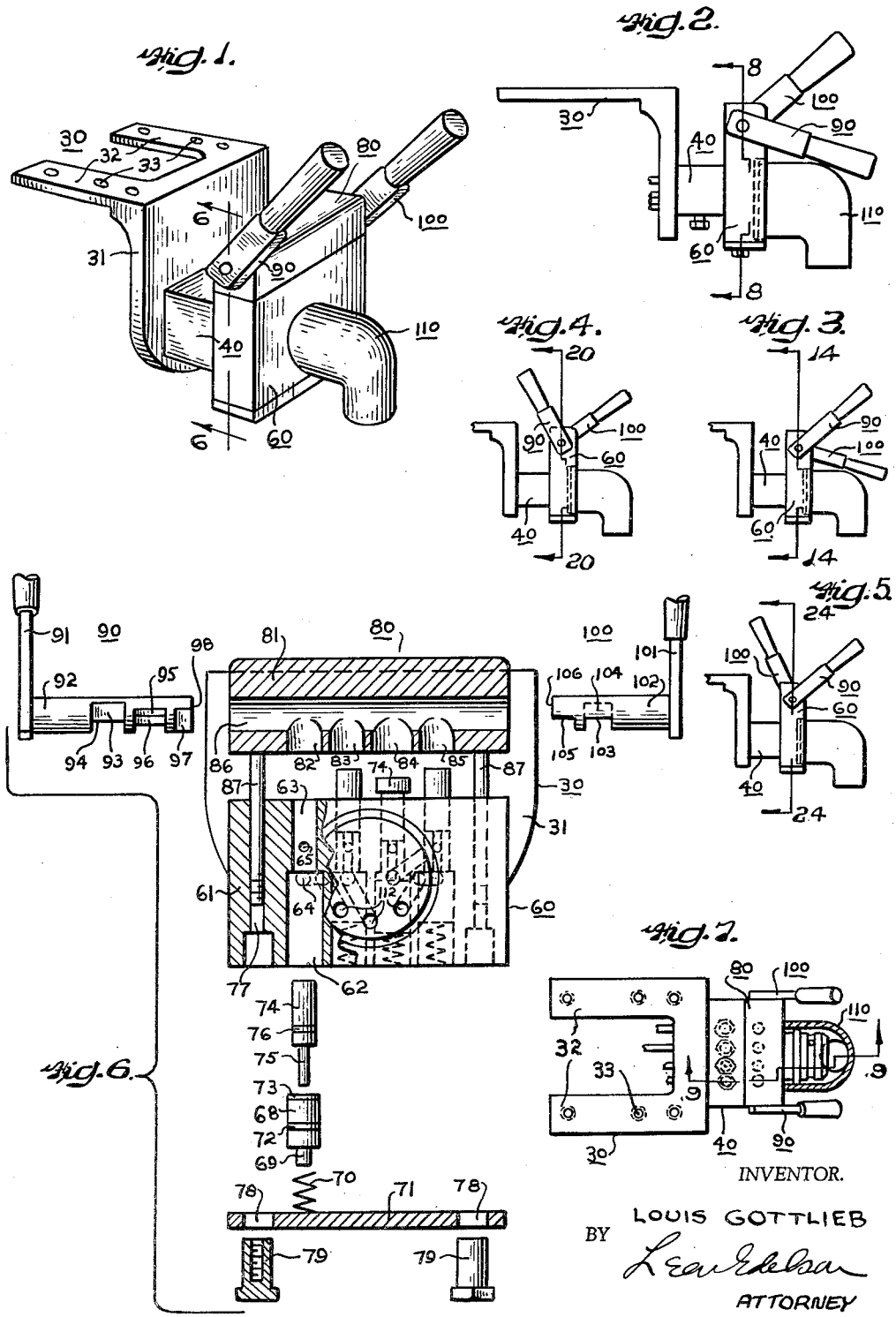
INVENTOR.
LOUIS GOTTLIEB
BY
ATTORNEY

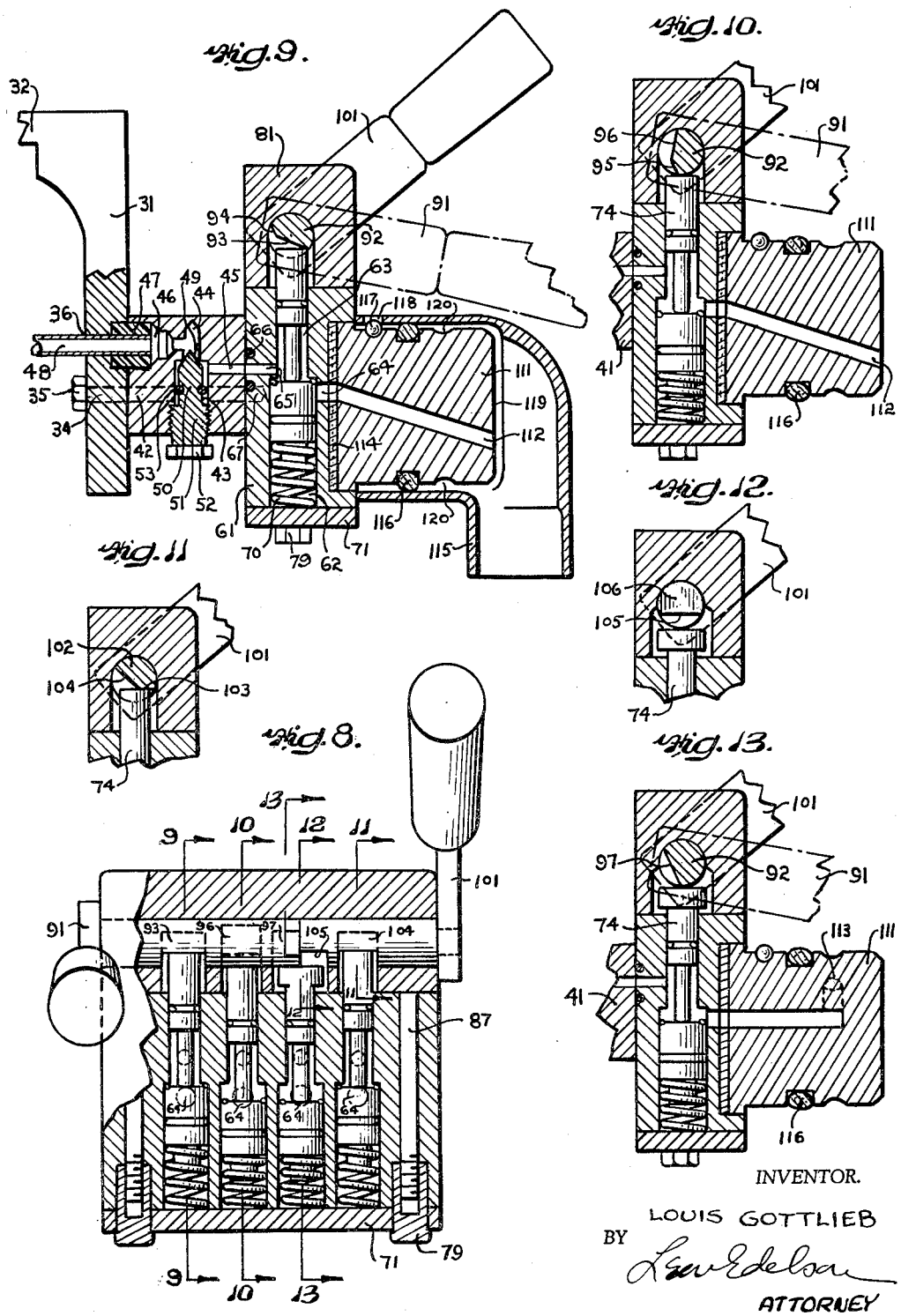

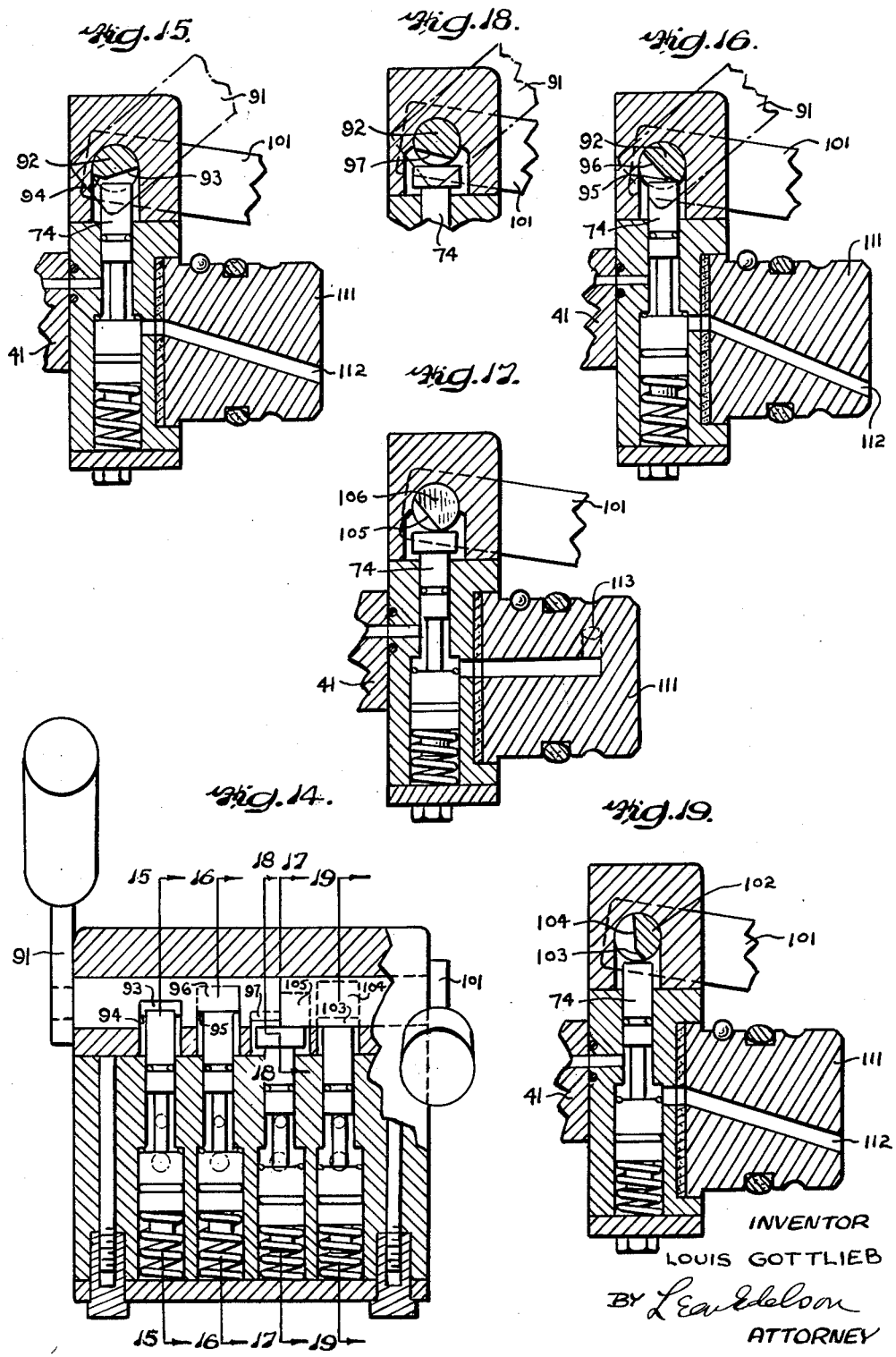

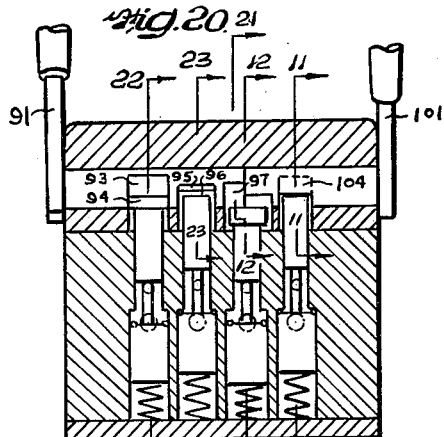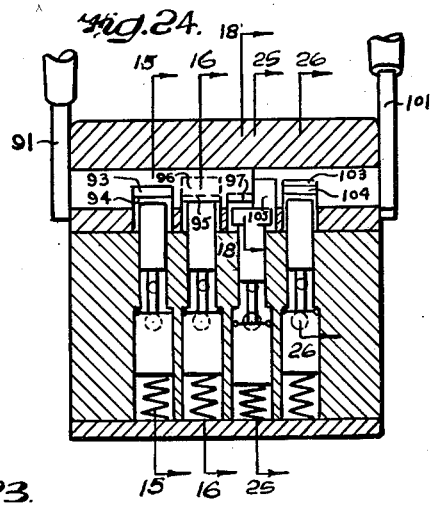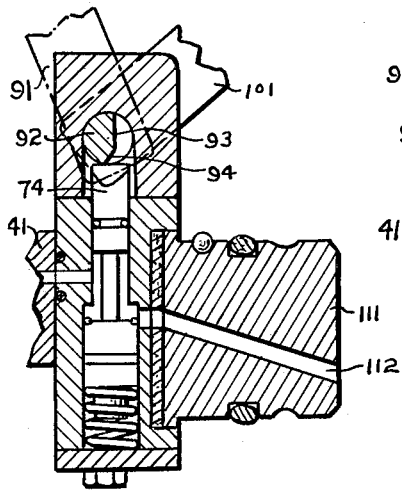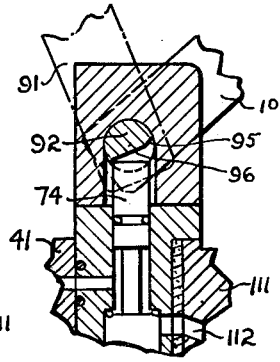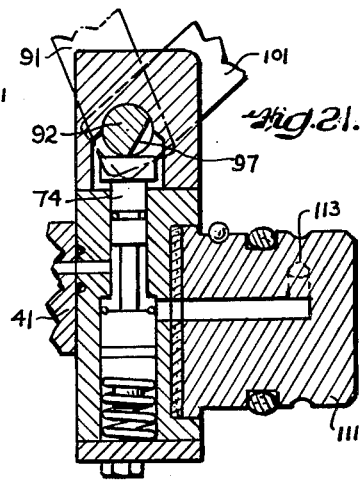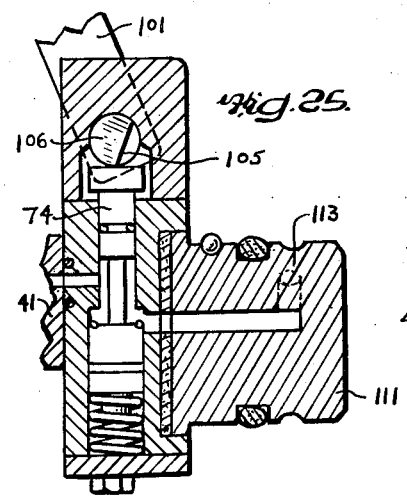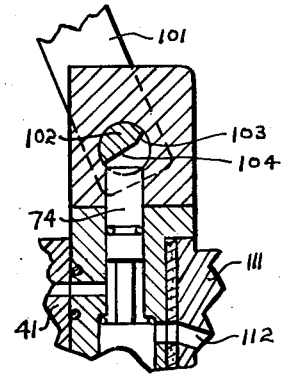
INVENTOR.
LOUIS GOTTLIEB
BY Leo Edelson
ATTORNEY

United States Patent Office 3,048,195
Patented Aug. 7, 1962

3,048,195
CARBONATED BEVERAGE DISPENSING
APPARATUS
Louis Gottlieb, 1505–07 Stillman St., Philadelphia, Pa.
Filed July 7, 1959, Ser. No. 825,544
7 Claims. (Cl. 137—637)

This invention relates to beverage dispensing apparatus, and more particularly relates to an apparatus for mixing and dispensing any one of a number of selectable flavored carbonated beverages. While the invention will be described in connection with the dispensing of flavored soda water, it should be borne in mind that the apparatus is not so limited, and the principles thereof are in fact applicable to numerous situations in which it may be desirable to mix one liquid with a selected one of a plurality of other liquids or to dispense the one liquid by itself without such mixing. By way of illustration, it may be desired to dispense plain milk, chocolate milk, or milk mixed with other flavoring syrups. Moreover, the principles of the invention may be found to be applicable to the mixing of fluids other than those intended to be dispensed as beverages.

In the past, soda fountains for the dispensing of carbonated beverages usually have taken the form of a number of tanks for storing flavored syrups, each with its own individual hand operated pump, and also including a lever operated discharge spout station for dispensing carbonated water into a glass or other container containing the flavored syrup from one of the syrup tanks placed therein by operation of the associated hand pump. Such soda fountains are large in size and occupy a substantial volume of space. Moreover, such soda fountains are expensive to purchase and install, and require a considerable time expenditure for purposes of maintaining them in a clean and sanitary condition, not to mention the fact that the hand pumps require periodic cleaning and flushing to insure against their becoming clogged with dried syrups which accumulate within the pump after a period of use. Accordingly, it is a primary object of my invention to provide a carbonated beverage mixing and dispensing unit which is extremely small in size, relatively inexpensive to manufacture and install, and which eliminates completely the need for hand pumps and storage tanks for flavored syrups located at the dispensing station.

Another object of my invention is to provide a novel carbonated beverage mixing and dispensing apparatus which is self-cleaning in nature and thereby does away with the labor cost of frequent and periodic cleanings.

Still another object of my invention is to provide a novel carbonated beverage mixing and dispensing apparatus which contains relatively few moving parts and which may be disassembled on the spot for the replacement of parts due to wear and be reassembled and replaced in use within a matter of minutes, thus resulting in a substantial saving of down-time and a minimum attendant loss in revenue due to inoperability.

A further object of my invention is to provide a novel carbonated beverage mixing and dispensing apparatus which is automatic in operation, requiring only the actuation of a handle to dispense a mixed flavored carbonated beverage, and including means whereby the proportion of flavoring to carbonated water may be controlled within relatively wide limits to provide drinks of varying sweetness as desired.

The foregoing and other objects of my invention will become apparent from a careful reading of the following specification in conjunction with an examination of the appended drawings, wherein:

FIGURE 1 is a perspective view of a complete soda fountain according to the invention and showing two lever type operating handles illustrated in their neutral or non-dispensing position, a dispensing spout from which the beverage issues, and a mounting bracket by means of which the fountain may be secured to a convenient support;

FIGURE 2 is a side view of the soda fountain seen in perspective in FIGURE 1 but illustrating the left-hand operating lever in a forward depressed position corresponding to the dispensing of a soda composed of carbonated water and a first flavored syrup;

FIGURES 3, 4 and 5 are similar to the showing of FIGURE 2 excepting that they illustrate three additional positions of the operating levers for purposes of dispensing different flavored beverages, FIGURE 3 showing the right-hand lever in forward depressed position with the left-hand lever in neutral position, FIGURE 4 illustrating the right-hand lever in neutral position with the left-hand lever in backward shifted position, FIGURE 5 illustrating the left-hand lever in neutral position with the right-hand lever in backward shifted position;

FIGURE 6 illustrates a partially exploded view of the soda fountain illustrated in perspective in FIGURE 1, some parts being shown in elevation and others in section as would be seen when viewed along the lines 6—6 of FIGURE 1;

FIGURE 7 illustrates a plan view of the apparatus as would be seen when viewed from above the showing of FIGURE 2, the dispensing spout being partially sectioned away to reveal certain details of the interior;

FIGURE 8 is a cross-sectional view through the apparatus as would be seen when viewed along the lines 8—8 of FIGURE 2, some parts being shown in section and other parts in elevation for purposes of clarity;

FIGURE 9 is a side sectional view through the apparatus as seen when viewed along the lines 9—9 of FIGURES 7 and 8, the left-hand operating lever being shown in phantom;

FIGURES 10 through 13 illustrate sectional views taken through the apparatus as would be seen when viewed along the lines 10—10, 11—11, 12—12 and 3—13, of the showing of FIGURE 8;

FIGURE 14 is a cross-sectional view through the apparatus as seen when viewed along the lines 14—14 of FIGURE 3;

FIGURES 15, 16, 17, 18 and 19, are sectional views taken along the correspondingly identified section lines shown on FIGURE 14;

FIGURE 20 is a cross-sectional view through the apparatus as seen when viewed along the lines 20—20 of FIGURE 4;

FIGURES 21, 22 and 23 are sectional views taken through the apparatus as would be seen when viewed along the corresponding section lines illustrated in the showing of FIGURE 20;

FIGURE 24 is a cross-sectional view through the apparatus as seen when viewed along the lines 24—24 of FIGURE 5;

FIGURES 25 and 26 are cross-sectional views taken through the apparatus as would be seen when viewed along the corresponding section lines illustrated in the showing of FIGURE 24.

In the several figures like elements are denoted by like reference characters.

Turning now to an examination of the figures, and considering first FIGURES 1 through 5, in FIGURE 1 there will be seen a mixing and dispensing unit including seven principal parts. The first of these parts is a mounting bracket 30 having a vertical front face 31 and a pair of rearwardly extending arms 32 formed integrally with the top of the face 31, and including a plurality of holes 33 for securing the mounting bracket to an overlying surface, as for example the underside of a counter or bar. Extending forwardly from the lower end of the face plate 31 of the mounting bracket is a flow regulator block assembly designated generally as 40, to the forward part of which is secured a valve block assembly 60 surmounted by a head block assembly 80 into which extend a pair of cam shafts not visible in the showing of FIGURE 1 and to which are secured a pair of operating handle assemblies 90 and 100. Finally, extending forwardly from the front face of the valve block assembly 60 is a mixing head and nozzle assembly 110.

The organization of the apparatus generally is as follows. A plurality of feed lines for soda water and different flavored soda syrups, or other liquids for that matter, enter the flow regulator block assembly 40 through the rear of the face plate 31 of the mounting bracket 30, where each entering line terminates in an individual conduit system each including a cone valve which may be adjusted to control the rate of flow from each entering line to ultimate discharge through the mixing nozzle assembly. Each of the cone valve regulated flow lines in the flow regulator block assembly 40 passes into an individual piston valve in the valve block assembly 60, and each of the piston valves communicates with a flow line which runs into the mixing nozzle assembly 110.

The opening and closing of the piston valves located within the valve block assembly 60 are controlled by the aforementioned not visible cam shafts located within the valve head block assembly 80, and operation of the cam shafts and hence the piston valves is controlled by the handle assemblies 90 and 100. For purposes of illustration a valve block assembly 60 will be described, and is so illustrated in the other figures, which contains four piston valves, three of which control the flow of different flavored syrups and the remaining one controlling the flow of carbonated soda water. The cam shafts are so arranged that actuation of the operating handle assemblies 90 and 100 enables the operator to selectively dispense either carbonated water by itself, or in the alternative carbonated water mixed with any one of the three differently flavored syrups. Thus, it will be understood that in the illustrated form of the invention any one of four different selections may be made.

To this end, the cam shafts and operating handles have been so arranged that each of the operating handles provides two dispensing positions and one neutral or shut-off position. The various dispensing positions are illustrated in the showings of FIGURES 2, 3, 4 and 5 wherein it will be observed that FIGURE 2 illustrates the operating handle 100 in its neutral position and the operating handle 90 in a forward depressed condition, which as will be subsequently seen in connection with the description of FIGURES 8 through 13, corresponds to the simultaneous actuation of the second and third piston valves for producing a first flavored soda water; FIGURE 3 illustrates the operating handle 90 in its neutral position and the handle 100 in its forward depressed condition which, as will be subsequently understood from the showings of FIGURES 14 through 19, corresponds to the simultaneous actuation of the third and fourth piston valves to produce a second flavored soda water drink; FIGURE 4 illustrates the operating handle 100 in its neutral position as in the showing of FIGURE 2 and also shows the operating handle 90 in a rearwardly displaced position which, as will be seen in the showings of FIGURES 20 through 23, corresponds to the simultaneous actuation of the first and third piston valves and produces yet a third flavored soda water drink; finally, FIGURE 5 shows the operating handle 90 in its neutral position and the operating handle 100 in its rearwardly displaced position which, as will be understood from the showings of FIGURES 24 through 26, corresponds to the actuation of the third piston valve only and results in the dispensing of plain unflavored soda water.

Thus, it should be now understood that the third piston valve controls the flow of soda water and the other three piston valves each control the flow of a different flavor syrup, so that the cam shaft arrangement is such that a flavored soda is dispensed by actuating the third piston valve in combination with a selected one of the remaining piston valves, and plain soda is dispensed by the actuation of the third piston valve alone. Therefore, in essence, the operating handles 90 and 100 control the dispensing or non-dispensing of the drink from the mixing nozzle assembly 110, and the flow regulator block assembly 40 controls the sweetness of the drink by determining the proportion of the syrup that is mixed with the soda water when the properly associated piston valve is actuated.

The clearest understanding of the mechanical structure and operating organization of the apparatus and embodying the concepts of my invention will be had from first referring principally to FIGURES 6, 8 and 9, after which the remainder of the figures will be readily understandable.

Turning now firstly to an examination of FIGURE 9 there will be seen the mounting bracket face plate 31 having drilled therethrough from back to front a plurality of holes. The lower spaced hole 34 is aligned with a similar hole 42 drilled through the flow regulator block assembly 40 and a third hole 67 drilled and tapped in the valve block 61 of the valve block assembly 60. A second set of such aligned holes is also formed in that portion of the apparatus which has been cut away by the sectioning, and disposed within each such set of aligned holes is a bolt 35, the bolt shaft extending through the bolting holes 34, 42 and threadingly engaged in the hole 67 in the valve block assembly. These bolts of course secure the mounting bracket 30, the flow regulator block assembly 40, and the valve block assembly 60 rigidly together, and when pulled up tight provide fluid tight seals between the front face of the mounting bracket face plate 31 and the rear of the flow regulator block 41 by means of the tubular compression seal 47, and a seal between the front face of the regulator block 41 and the rear face of the valve block 61 by means of the sealing ring 66.

The tubular compression seal 47 is seen to snugly enclose the end of a tubular feed line 48, which represents one of the four feed lines previously alluded to for conveying the soda water and flavor syrups to the mixing apparatus. The tubular compression seal 47, and in fact all of the subsequently to be mentioned sealing rings and gaskets, may be made of rubber or other equivalent material, and is dimensionally formed so that its outer diameter is subsequently equal to the inner diameter of the enlarged bores in the face plate 31 of the mounting bracket and the flow regulator block 41, and of a length slightly longer than the combined lengths of these enlarged bores so that with the feed line 48 extending through the compression seal 47 as illustrated, the latter will be forced to expand radially inwardly when the assembly bolts 35 are drawn up tightly to thereby provide a liquid seal which prevents the syrup or soda carried by the feed line 48 from escaping anywhere except forwardly into the reducing cross-section transition section 46 in the flow regulator block assembly 40.

From the transition section 46, the syrup or soda flows forwardly in the cone valve upper bore 44 and downwardly into the cone valve lower bore 43 for continued forward passage through the valve outlet passage 45. For controlling the rate of flow from the cone valve upper bore 44 to the lower bore 43 and hence to the outlet passage 45 there is provided a cone valve having a conical upper portion 49 surmounted upon a reduced diameter portion 50 of smaller diameter than the cone valve lower bore 43, which in turn is underlaid by a threaded end portion 51 which is threaded into the bottom wall of the regulator block 41.

A sealing ring 53 is disposed circumferentially about the valve stem reduced diameter portion 50 at a point along the length thereof such that this sealing ring is always spaced below the valve outlet passage 45 and provides a liquid tight seal about the circumference of the cone valve lower bore 43 to prevent the liquid flowing through the valve from passing downward around the threads of the end portion 51 and leaking out the bottom of the regulator block 41. An adjusting head 52 is fashioned at the lower terminus of the valve stem threaded end portion 51 and projects externally of the regulator block 41. This adjusting head 52 provides a means for advancing or retracting the valve stem to provide a desired amount of clearance between the valve stem cone and the valve seat formed at the junction of the upper and lower cone valve bores 44 and 43 respectively for purposes of controlling the rate of flow through the valve when flow therethrough is permitted by actuation of the appropriate operating handle.

In addition to the showing of FIGURE 9, attention should now also be directed toward the showings of FIGURES 6 and 8 but principally to FIGURES 6 and 9. Considering now the valve block assembly 60, there will be seen the valve block 61 having formed therein a piston valve lower bore 62 extending upwardly to connection with a piston valve upper bore 63 of reduced diameter in cross section. Extending forwardly from the piston valve lower bore 62 is a valve outlet passage 64, and running rearwardly from the piston valve upper bore 63 is a valve inlet passage 65 aligned as a continuation of the cone valve outlet passage 45 of the flow regulator block assembly, the junction between the passages 45 and 65 being rendered liquid tight by the sealing ring 66 which has been placed in compression by the tightening of the assembly bolts 35.

Disposed within the piston valve lower bore 62 is a valve piston 68 having a depending central stem 69 disposed within a compression spring 70 so oriented that the top of the compression spring bears against the under surface of the valve piston 68. The lower end of the compression spring 70 is seated upon the upper surface of a valve block bottom plate 71 which latter is secured tightly against the bottom surface of the valve block 61 by means of the take-up nuts 79 and head bolts 87 which are threadedly engaged with one another through the bolting holes 77 and 78, the bolt holes 77 being drilled vertically through the valve block 61 and the bolting holes 78 extending through the bottom plate 71.

Disposed about the body of the valve piston 68 are a pair of sealing rings 72 and 73, the former preventing the passage of fluid downwardly beyond the sealing ring 72, and the upper sealing ring 73 providing a liquid tight seal between the piston valve upper bore 63 and the piston valve lower bore 62 when the valve piston 68 is forced upwardly by the compression spring 70 in the manner best seen in FIGURE 9. The position of the valve piston 68 as seen in FIGURE 9 corresponds of course to a closed position of the valve wherein no transfer takes place from the fluid supply to the mixing nozzle assembly and is the position occupied by all of the valve pistons when both of the operating handles 90 and 100 are in their neutral position as seen in FIGURE 1. Actuation of the operating handles causes one or more of the valve pistons 68 to be depressed against the upward bias provided by the compression springs 70 to thereby allow the valve outlet passage 64 to be placed in direct communication with the inlet passage 65 and hence permit fluid flow through the piston valve to the mixing nozzle assembly.

The means for selectively depressing the valve piston 68 will now be described. Disposed within the piston valve upper bore 63 is a driving piston 74 having a centrally depending reduced diameter stem portion 75, the lower end of which is seated upon the upper surface of the valve piston 68. Disposed circumferentially about the driving piston 74 is a sealing ring 76 which serves the purpose of preventing the fluid flowing into the piston valve upper bore 63 from passing upward beyond the sealing ring and into the cam shaft space in the valve head block assembly 80. The passage of syrups into the region where the cam shafts engage the driving piston heads would naturally cause a gumming condition to occur resulting in sticky operation of the valves and operating handles. Moreover, the absence of a lower sealing ring 72 disposed about the body of the valve piston 68 would allow these syrups to eventually flow down into the space occupied by the compression springs 70, and when such space became filled with the liquid would prevent depression of the valve pistons 68 and render the operating handle assemblies 90 and 100 essentially inoperative by hydraulically locking the handles in their neutral positions.

Directly above the valve block assembly 60 is the valve head block assembly 80 including the head block 81 and the depending head bolts 87 already previously mentioned as being for the purpose of securing the valve block assembly and valve head block together. The head block 81 includes the driving piston head bores 82 through 85 each spaced in vertical registry with an underlying piston valve upper bore 63 in the valve block 61 and into which the top portion of each of the driving pistons 74 extends. Drilled horizontally through the head block 81 is an open ended cam shaft bore 86 which connects with each of the driving piston head bores 82 through 85, and within which are disposed the cam shafts 92 and 102 associated respectively with the left-operating handle assembly 90 and right-operating handle assembly 100.

The handle assembly 90 includes an operating handle 91 pinned or keyed or otherwise secured to the left-end of the cam shaft 92, and similarly, the operating handle assembly 100 includes an operating handle 101 similarly secured to the right-hand end of the right cam shaft 102. The cam shafts 92 and 102 are of such length that when fully inserted within the cam shaft bore 86 within the valve head block assembly 80, the cam shaft's end faces 98 and 106 lie closely adjacent one another in facing relation and are both disposed centrally above the driving piston 74 located third from the left as viewed in the showing of FIGURE 6. It will be noted that the head of this driving piston is somewhat broadened as compared to the other three driving pistons. This is because both cam shafts 92 and 102 are enabled to actuate this piston and a camming surface of sufficient area is desirable.

For purposes of future reference, the valve block assembly pistons will be designated as first, second, third and fourth pistons as viewed in the showing of FIGURE 6, with the first piston being that on the left and the fourth piston being that on the right. As will be seen in the showing of FIGURE 6 the cam shaft 92 of the left-operating handle 90 is selectively notched along its length to provide a plurality of cam shaft flats 93 through 97, and the right cam shaft 102 similarly selectively notched to provide the cam shaft flats 103, 104 and 105. It is these particularly oriented cam shaft flats which provide for the selective actuation of the valve pistons in the valve block assembly 60. However, before entering upon a detailed description of the organizational inter-relationships of the cam shafts and valve pistons, the mixing nozzle assembly 110 will be first described.

The mixing nozzle assembly 110 includes a generally cylindrically shaped nose block 111, the rear surface of which is recessed into the front of the valve block 61 and is secured in position as seen in FIGURE 9 by means which are not shown, any convenient securing method being suitable. Clamped between the rear surface of the nose block 111 and the facing portion of the valve block 61 is a nose block gasket 114 which serves to prevent the soda or syrup flowing forward through the four individual valve outlet passages 64, one being associated with each of the valve pistons, from working laterally over into a nose block outlet passage 112 from which it should be isolated. Obviously, if one flavor syrup could work its way into the outlet passage for a different flavored syrup, then the resulting flavored soda would be a mixture to some extent of more than one syrup flavoring which would certainly be undesirable.

It will be seen from the showing of FIGURE 6 that the outlet passages 64 of the first, second and fourth piston valves each connects to a different passage 112 which extends forward through the nose block 111 to the nose block front face 119, and that the outlet passage 64 from the third piston valve extends upwardly toward the right and opens on the cylindrical side surface of the nose block 111. As also best seen in the showing of FIGURE 9, the entire nose block 111 is surrounded by the mixing nozzle and discharge spout 115 which turns downwardly at its front to produce a downwardly directed stream of soda for discharge into a glass or other underlying receptacle. The nozzle 115 is easily mounted upon the nose block 111 by a push-on action which slides the nozzle rearwardly over the nose block until the indexing hole 118 in the top of the nozzle slips over into registry with the ball bearing 117 seated in a depression in the top of the nose block. The sealing ring 116 prevents the soda water being discharged from passing backward and emerging from the nozzle at points other than from the discharge spout. Additionally, the sealing ring 116 provides a frictional engagement with the mixing nozzle 115 which holds the latter relatively securely in position.

The first, second and fourth cylinder outlet passages 112 permissibly run forward directly to the front face 119 of the nose block 111 because the flavor syrups discharged through these passages are under relatively low pressure and are discharged with no great force, whereas on the other hand, the third cylinder outlet passage 113 angles upwardly to the right and emerges into the rather narrow annular space 120 between the nose block cylindrical side surface and the inside of the mixing nozzle 115 because the soda water itself enters the flow regulator block assembly under a pressure of approximately 120 pounds, and although this pressure is somewhat reduced when passing through the cone valve and piston valve associated therewith, nevertheless the soda water emerges from the passage 113 under a relatively high pressure.

The pressure of the soda water is of course quite substantially reduced by being forced to pass into the relatively narrow annular region 120 before emerging into the region of the discharge spout, the latter being of much greater volumetric capacity. By causing the soda water to discharge into the annular region 120, and at an elevation approaching the top of the nose block cylindrical surface, the soda water upon emergence from the passage 113 completely fills the annular region 120 passing over the top of the nose block 111 in addition to flowing downwardly along the side. Thus, the soda water prior to mixing with the flavor syrup in the region of the discharge spout provides a washing action for the nose block 111 and the inside of the mixing nozzle and discharge spout thereby preventing the build up of sugary residues on these surfaces and maintaining them in a state of constant cleanliness.

Returning now to a consideration of the means for selectively actuating the various pistons in the valve block assembly 60 by means of the handle operated cam shafts 92 and 102, it will be seen from the showings of FIGURES 6, 8, 14, 20 and 24 that the cam shafts when assembled into the valve head block assembly cam shaft bore 86 are so disposed that the cam shaft flats 93 and 94 lie directly above the top surface of the driving piston 74 associated with the first piston valve; that the cam shaft flats 95 and 96 are similarly disposed relatively to the second piston valve; that the cam shaft flats 97 and 105 are disposed above the driving piston of the third piston valve; and finally, that the cam shaft flats 103 and 104 are disposed above the driving piston for the fourth piston valve.

Considering first the showing of FIGURE 8 which illustrates the simultaneous actuation of the second and third piston valves to produce a first flavored soda, it is observed that the left-hand operating handle 91 is in its forward depressed position while the right-hand operating handle 101 remains in neutral. The effects produced by the forward depression of the left-hand handle 91 are seen in the cross-sectional views of FIGURES 9, 10 and 13 from which it may be seen that the second and third driving pistons will be driven downward by the periphery of the cam shaft 92 while the driving piston of the first piston valve remains undepressed by virtue of the fact that the cam shaft flat 93 is disposed immediately thereabove. FIGURE 11 shows that the fourth piston valve is undepressed when the right-hand operating handle 101 is in its neutral position because it faces the cam shaft flat 103. FIGURE 12 shows that while the driving piston 74 of the third piston valve is depressed, this depression is not due to the cam shaft 102 because the flat 105 would prevent such depression, it of course being realized that the illustrated depressed position of the third piston valve driving piston is due to the cam shaft 92.

Turning now to the showing of FIGURE 20, it is seen that the first and third piston valves are depressed corresponding to the mixing of a soda of a second flavor, and that in this showing the right-hand operating handle 101 is in the same neutral position as occupied in the just described showing of FIGURE 8, however, the left-hand operating lever handle 91 is now seen to be in its rearwardly displaced position. Therefore, from a comparison of FIGURES 8 and 20 it is clear that the forward depressing of the left-hand operating handle causes the actuation of the second and third piston valves whereas the rearward shifting of the left-hand operating handle 91 causes the actuation of the first and third piston valves. Since in both FIGURES 8 and 20 the right-hand operating handle 101 is shown to be in its neutral position, it is clear that the position of the cam shaft 102 in the showing of FIGURE 20 is identically the same as that associated with the showing of FIGURE 8, and hence as indicated, the sectional views of FIGURES 11 and 12 depict the physical conditions associated with the cam shaft 102 in the showing of FIGURE 20 as well as in the showing of FIGURE 8.

Turning now to FIGURES 21, 22 and 23 which illustrate the conditions brought about by the cam shaft 92 when the left-hand operating handle 91 is rearwardly shifted, it is seen that the second piston valve remains unactuated because the top of the driving piston associated therewith is apposed by the cam shaft flat 96 as illustrated in the showing of FIGURE 23. However, the showings of FIGURES 21 and 22 indicate that the cam shaft flats 93, 94 and 97 have been rotated out of facing apposition with the top of their associated driving pistons so that the circumference of the cam shaft 92 is brought into camming engagement with these driving pistons and hence shifts them downwardly to open the first and third piston valves.

FIGURES 14 and 24 both show the left-hand operating handle 91 to be in its neutral position and hence the first and second piston valves must remain unactuated, as will be seen in the showings of FIGURES 15 and 16 where it will be observed that the top surfaces of the driving pistons are in facing relationship to the cam shaft flats cut into the cam shaft 92. FIGURES 14 and 24 differ in that the showing of FIGURE 14 illustrates the case where the right-hand operating lever 101 has been forwardly depressed, whereas FIGURE 24 illustrates the opposite condition wherein the right-hand operating handle 101 is in its rearwardly shifted position. From the cross-sectional views of FIGURES 17 and 19 associated with the showing of FIGURE 14, it will be seen that the cam shaft 102 has been caused to rotate so that its periphery causes the depression of the driving piston of both the third and fourth piston valves by rotating the cam shaft flats 103, 104 and 105 out of facing relationship with the underlying driving pistons. The showings of FIGURES 25 and 26 illustrate that when the right-hand operating handle 101 is shifted rearwardly, the third piston valve is actuated by the cam shaft 102, but the fourth piston valve remains unactuated because the top of the driving piston is faced by the cam shaft flat 104 and hence remains undepressed.

From the foregoing it should be now clear that the principles of my invention can be extended to other arrangements whereby more or less than the four illustrated combinations may be effected and although my invention has been described in connection with a particularly illustrated embodiment thereof it is to be understood that various changes and modifications will now naturally occur from time to time to those persons normally skilled in the art without departing from the essential spirit or scope of my invention, and accordingly it is intended to claim the same broadly as well as specifically as indicated by the appended claims.

What is claimed as new and useful is:

1. A valved fluid mixing apparatus comprising, a plurality of individual conduit lines including a separate valve in each of said conduit lines, each valve permitting fluid flow through its associated conduit from an inlet end to an outlet end when actuated and preventing such fluid flow when deactuated, control means operable for selectively actuating the valves in said conduit lines, a first valve being always actuated whenever said control means is operated, independently of whether any other of said valves is also actuated, and a mixing nozzle assembly coupled to said conduit lines comprising a nose block disposed within a removable mixing nozzle and discharge spout, said nose block having a plurality of fluid flow passages extending therethrough from rear to front, each of said passages having an inlet end at the rear of the nose block and an outlet end, the inlet ends of said nose block passages being coupled respectively to the outlet ends of said conduit lines and hydraulically isolated from one another, the nose block passage coupled to the conduit line in which is located said first valve extending forward and upward through the nose block and terminating at an outlet end opening through the side of the nose block proximate the top thereof, the remaining nose block passages extending forward through the nose block and terminating at outlet ends on the front thereof, said mixing nozzle and discharge spout surrounding said nose block in closely spaced relation to the nose block sides to provide a space of small volumetric capacity into which the side opening nose block passage discharges, and being spaced forward of the nose block front to provide a space of substantially larger volumetric capacity into which the front opening nose block passages discharge, said small and larger volumetric capacity spaces being interconnected so that fluid flow from the side opening nose block passage also discharges through the larger volumetric space and washes the sides and front of the nose block.

2. A valved fluid flow control apparatus comprising, a valve block, a plurality of piston valves in said valve block, an inlet passage and an outlet passage in said valve block for each valve, first control means for selectively opening said valves two at a time, and second control means for automatically closing each opened valve when said first control means is deactuated, each of said piston valves comprising first and second end connected coaxial cylindrical bores of different cross-sectional area formed in said valve block, said inlet passage connecting one of said bores outward through the valve block and said outlet passage connecting the other of said bores outward through the valve block, first and second pistons close fittingly disposed within said first and second bores respectively for axial movement therewithin, the piston disposed within the larger bore being biased into sealing engagement with the bore end connecting to the smaller bore by said second control means to thereby isolate said inlet and outlet passages from one another, the piston disposed within the smaller bore being axially shiftable therewithin by said first control means for driving the piston in the larger bore out of its sealing engagement by overcoming the bias of said second control means to thereby connect said inlet and outlet passages to one another through said first and second bores, said first control means including a pair of end-to-end positioned rotatable cam shafts having a common rotational axis disposed substantially orthogonally to the cylindrical axis of each of said plurality of cylindrical bores with the extended axes of the bores passing through the cam shafts, said cam shafts being rotatable independently of one another and having their meeting ends disposed adjacent to the piston disposed within the smaller bore of a particular one of said plurality of valves, said cam shafts when each in a first position being ineffective to overcome the bias of said second control means and when rotated independently into any one of a plurality of other positions different from said first position being effective to cam the pistons in the smaller bores of said particular valve and a selected other valve, each selected other valve being a different one of said plurality of valves determined by the rotational position of said cam shafts, whereby said particular valve is always cammed by said cam shafts when the latter are so rotated.

3. The valved apparatus according to claim 2 wherein said first bore is said larger bore and is connected outward through the valve block by said outlet passage.

4. The valved apparatus according to claim 2 wherein said second control means includes a plurality of compression springs, one spring being disposed within the larger bore of each piston valve with one spring end pressingly engaged with that end of the piston disposed in said larger bore which is remote from the smaller bore.

5. The valved apparatus according to claim 2 wherein said larger bore has an annular sealing ring disposed therein at its end connecting to the smaller bore, and said sealing ring effects a peripheral seal between said larger and smaller bores when compressed by the end of said piston disposed in the larger bore under the influence of said second control means.

6. The valved apparatus according to claim 2 wherein the piston disposed within the smaller bore includes an axially extending portion of reduced cross-section engageable with that part of the piston in the larger bore which seals the end of said larger bore, said reduced cross-section portion being projectable into the larger bore to thereby shift the piston therein out of sealing engagement with the end of said larger bore when said first control means is selectively actuated, and wherein said second bore is said smaller bore and is connected outward through the valve block by said inlet passage.

7. The apparatus according to claim 1 wherein said nose block is generally cylindrical in shape with the cylindrical surface defining the nose block sides and the ends of the cylinder defining the rear and front of the nose block, and further including a gasket extending peripherally about the nose block cylindrical surface and disposed rearward of the side opening nose block passage effective to prevent fluid flow rearward between the nose block and surrounding closely spaced mixing nozzle.

References Cited in the file of this patent
UNITED STATES PATENTS

| | | |
|---|---|---|
| 973,914 | Caffery | Oct. 25, 1910 |
| 2,573,888 | Benjamin | Nov. 6, 1951 |
| 2,580,553 | King | Jan. 1, 1952 |
| 2,639,724 | Cohen | May 26, 1953 |